March 17, 1970   M. W. QUARLES, JR   3,500,543
METHOD FOR EDITING SEISMIC TRACES
Filed Oct. 31, 1967   3 Sheets-Sheet 1

INVENTOR,
MILLER W. QUARLES, JR.

BY Watson, Cole, Grindle & Watson
ATTORNEYS

INVENTOR,
MILLER W. QUARLES, JR.

BY Watson, Cole, Grindle & Watson
ATTORNEYS

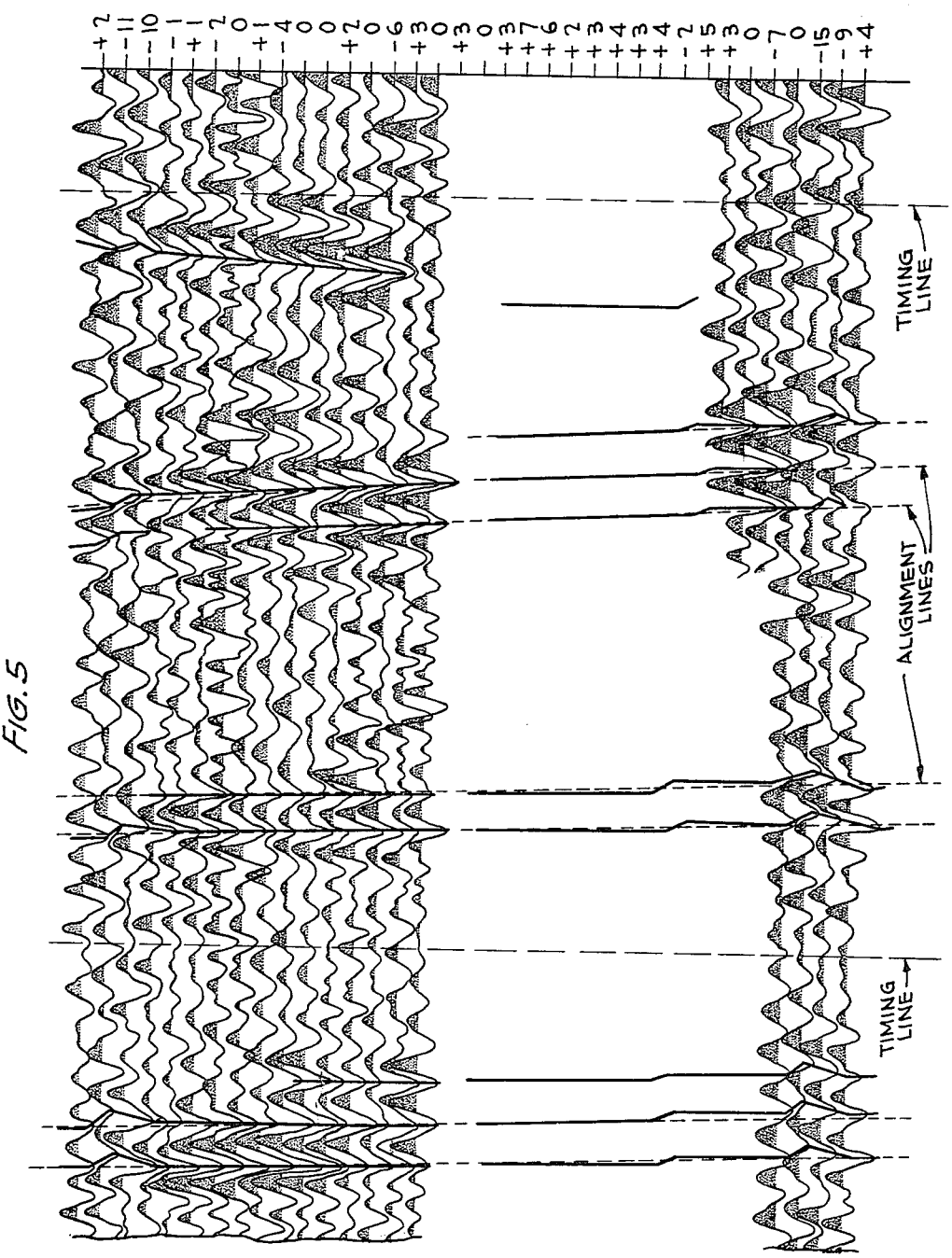

United States Patent Office 3,500,543
Patented Mar. 17, 1970

3,500,543
METHOD FOR EDITING SEISMIC TRACES
Miller W. Quarles, Jr., San Antonio, Tex., assignor to Petty Geophysical Engineering Company, San Antonio, Tex., a corporation of Delaware
Filed Oct. 31, 1967, Ser. No. 679,471
Int. Cl. B43l 13/20
U.S. Cl. 33—1                                   8 Claims

ABSTRACT OF THE DISCLOSURE

This invention relates to a method of editing seismic recordings to obtain highly accurate corrections on seismic traces to enhance the reflections. The prominent reflections are marked on each trace of a different set of cross sections and the reflections transferred to an overlay. The corresponding reflections are combined to form an alignment section which is assembled and coordinated with the original seismic traces in such a way that the combined reflections serve as reference lines to establish independent corrections for shifting each seismic trace to align the respective reflections.

---

This invention relates to a process for editing seismographic recordings to obtain more accurate correction data for shifting the prominent reflections of seismic traces. Such corrections applied before stacking improve both the character and phase alignment of a seismic section and therefore provide for a superior interpretation of the reflections which appear on the section. Nearly all seismic recording is based upon individual seismograms on which appear reflections indicating the various strata of the earth. One of the problems encountered in interpreting recorded data received from any type of spread configuration used in multiple coverage (common reflection point) techniques on land or water, resulting from either single explosive impacts or of compositive impacts as in Dinoseis, is the task of searching out and verifying valid reflected energy.

The need for editing seismic recordings was greatly accelerated by the advances made in the techniques of tape recording and of section displays which indicate the reflected data of interest. The CRP or "stacking" process greatly accelerated the need for recognizing and straightening the weathering patterns in order to present an ideal portrayal of smooth reflections representing smooth geologic strata.

In accordance with the invention, the process begins with each individual record shot which is recorded on tape by field crews. Each record is then transferred, either by digital or analog data processing techniques, onto another tape or directly to a paper display with the normal moveout removed and with customary correction to datum applied to every trace. The corrected information on the tapes is then transferred by any convenient means to a paper display. The paper records are then trimmed and marked as to their respective sub-surface locations. The recordings are then positioned and taped together in correct horizontal scale to form single-coverage cross-sections. A machine plotter may be used to transfer the original taped data directly to a cross-section with the proper sub-surface horizontal positioning and with the normal moveout and customary corrections applied. Such sections are called "brute" displays which have normal moveout removed and static field corrections applied just as a routine conventional section would be processed for interpretation. The number of sections made is equal to the number of stacks, that is, six sections for a six-fold stack, three sections for a three-fold stack, etc. These sections are known as single sub-surface coverage record sections since there is only one trace for each reflection point.

The prominent reflections are marked on each single coverage section by the use of a template which is laid over each record of the record section. After the reflections have been identified on each of the sections a clear plastic sheet is placed over each record section and accurately postioned with two or more widely spaced timing lines drawn on it and a few sub-surface common reflection locations marked along the top. All the prominent reflections on a section are traced through onto the plastic sheet with a colored pencil or colored ink in the form of a continuous line coinciding with the troughs of the pulses appearing on the section. This process of tracing in the reflections on the plastic overlay is repeated six times in different colors, one for each section, that is, six times for six-fold stacking, three times for three-fold stacking, etc., resulting in six sets of reflection data superimposed on one another to give a "rainbow" appearance. This traced information on the plastic overlay shows how accurately each record has been corrected and whether or not adequate data is available for the stacking process. For example, an exact coincidence of reflections derived from all six sections would mean perfect corrections had been made and no further editing would be necessary. This ideal situation is practically never achieved as normal variations in the best of corrected data is probably plus or minus 10 milliseconds.

A grouping of reflection data in close proximity indicates that the data have been derived from the same horizon but are inadequately corrected for true coincidence. The seismologist is then in a position to make a visual analysis of the section to decide on the average time or the best time for use for a given reflection. This sectional overlay contains all the necessary data to draw in the best smooth line representing the most accurate exact position of a single reflection trough to represent the variety of times present from all of the record sections.

The condensing of the data into a single alignment line is done on another piece of plastic overlay called the alignment section that has been accurately positioned over the rainbow section with the same reference timing lines and reference sub-surface point locations. The alignment lines are traced through onto this alignment section only in those instances where several colored lines are in close enough proximity to indicate that reflections are derived from a common sub-surface source or horizon. The rainbow section makes it possible to judge the data objectively and to discard useless or fragmentary data as well as to utilize all available reliable data. When the alignment section is complete with the alignment lines drawn in, it is positioned over one of the original record sections with the timing lines superimposed and in the proper horizontal position. The alignment lines then provide a variety of reliable reference levels to which reflection troughs on all the seismic traces may be corrected by applying either minus or plus correction times to each trace as needed to pull the troughs into conformance with the alignment lines.

The presence of at least three or more alignment lines provides a check for noise or other distortion that may be mistaken for reflected energy. The new static corrections obtained by this process are applied to the tapes of records as displayed and are then stacked in the usual manner. If the paper section had been made directly from the field tapes while normal moveout and usual corrections were applied, then these new edit corrections would be added or subtracted to these usual corrections for final stacking.

The single coverage fully corrected tape displays provided during this editing process reveal many types of errors such as noisy traces, dead traces, transposed traces, reverse records, shots in weathering, shots at wrong stations, unequal spread lengths, erratic weathering changes, imperfect normal moveout applications, need for correcting malfunctioning instruments, and excessive alternating current pick-up, etc. Furthermore, the records in the single coverage section displays may reveal errors in time break location, misties between records, and other types of malfunction of playback apparatus. Major static errors, as evidenced by grossly erratic reflection patterns, may be revealed. The rainbow section may reveal errors in corrections to datum where an entire record may be timed early or late. The rainbow sections may also indicate such a variation in reflection times that it would be useless to attempt the stacking process without improving static corrections by the process disclosed by this invention.

The presence of several alignment lines on the alignment section permits an analysis of each trace throughout a considerable span of time and may show the entire trace to be erratic and unreliable. Thus, corrections to a single reflection where noise might be mistaken for reflected energy are prevented. A completely erratic trace can simply be deleted and will not harmfully affect the stacking.

The relatively smooth shape of the alignment lines causes the resultant stack section to have a smooth appearance that truly portrays geologic structure rather than portraying some imperfect geophysical manifestations of such structure. As the actual reflecting geological horizons are smooth, it is appropriate and advantageous to obtain correspondingly smooth seismic sections.

A further advantage of this editing technique is that since only prominent reflection data are used to determine correct static shifts, the weakened data from deeper horizons or reflection points is enhanced to provide reliable interpretation of the seismic recordings.

A most important advantage of the editing process is the preservation of "character." The true character and frequency of the common reflection point energy returning to the surface is only maintained if such returned energy is equalized in time prior to stacking. The stacking of poorly or unequally timed reflection pulses considerably alters the frequency and character of the reflected energy.

Therefore, the primary object of the invention is to provide exact corrections to a seismographic recording before stacking to improve both the character and phase alignment of a seismic section to provide more perfect interpretation of the reflection points on such seismographic recording.

Another object is to provide an editing technique which can be used with any type of spread configuration used in multiple coverage (common reflection point) techniques on land or water whether with explosives used for an energy source or with surface impactors.

And yet another object of the invention is to provide an editing process which enables the seismologist to obtain a more accurate interpretation of the reflections on a seismic trace.

And yet still another object of the invention is to provide an editing process which makes it possible to objectively judge reflection data and to discard useless or fragmentary data.

A still further object of the invention is to provide an editing process for correcting seismic recordings which preserves the character of the reflections thereon.

The nature and advantages of the invention will appear more fully from the following description and the accompanying drawings which illustrate a preferred form of the invention. It is to be understood, however, that the drawings and description are illustrative only and are not intended to limit the scope of the invention except in so far as limited by the claims.

In the drawings:

FIGURE 1 illustrates single coverage records made into a section with the prominent reflections drawn in;

FIGURE 5 is an enlarged representation of a cross-section illustrating the manner in which the alignment lines of FIGURE 4 are used to determine the necessary shift for each trace such that the reflections are aligned.

Figure 1:

With reference to FIGURE 1, a single coverage record section consists of all traces from a single source arranged in the sequence of the detectors, then another source to each detector, so that there is only one trace for each reflection point. The traces, before being combined into the single coverage section as illustrated in FIGURE 1, are preferably individually corrected with the normal corrections, i.e. datum, moveout. In other words, prior to being assembled in a section, each trace is provided with static corrections and normal moveout corrections. Profiles may be obtained using multi-fold coverage such as three-fold coverage, six-fold coverage, etc. The single coverage section shown in FIGURE 1 was obtained from a profile using three-fold coverage and uses only every third shot to provide the single coverage section. A similar diagram to that of FIGURE 1 would be made using the next series of every third shot point to make a second single coverage section. Finally a third section similar to FIGURE 1 would be made by utilizing the remaining every third shot point. In this manner three single coverage sections rather than one three-fold stack section are obtained.

The record sections are assembled in the following manner. Each individual record shot that has been recorded is played back, either by digital or analog data processing equipment, onto another tape or on paper with the normal moveout removed and with the customary corrections to datum, weathering, etc., applied to every trace. Using such fully corrected tapes, a paper display is made of each tape on a good quality paper. The individual records are then arranged into sections as shown in FIGURE 1 either by a machine or by trimming the records along the sides and fastening them together with mending tape to have each sub-surface reflection point fall in its proper position and at a true horizontal scale.

If end trace coverage is duplicated (as in some split-spread techniques, or other duplication of sub-surface coverage occurs from irregular layouts, then the record ends should overlap. If a center geophone group has been disconnected at the shot point and not recorded, then a no-trace gap must be left by the playback apparatus. If an entire shot point is skipped, then white paper at the proper horizontal scale is inserted to fill the gap.

The timing lines should match across the section. In case of some shrinkage of the paper records, then the timing lines near the most pronounced reflections should be matched, for example, at 1.500 and 2.500 seconds.

The reflections are then marked on the records preferably in red for contrast. A template may be used, and may be necessary in some cases, to determine weathering patterns that will aid in identifying true reflected energy. If many reflections are present, only the most pronounced eight or ten need be drawn in, as in FIGURE 2. With very poor data an extreme effort may be necessary to identify and draw in just a few reflections.

Each of the three single coverage records obtained from the above process is marked with the prominent reflections such as shown by the solid lines in FIGURE 1. The reflections on the single coverage sections are identified and located by their "character." The "character"

of each seismic trace is identified with the surface point from which the seismic energy was generated since seismic energy transmitted from the same surface point should produce the same "character" on the various single point coverage recordings. Reference is made to H. M. Houghton's article, "Change of Reflection Amplitude and Character with Geophone Depth," April 1940, Geophysics, for a more detailed explanation of "character."

Figure 2:
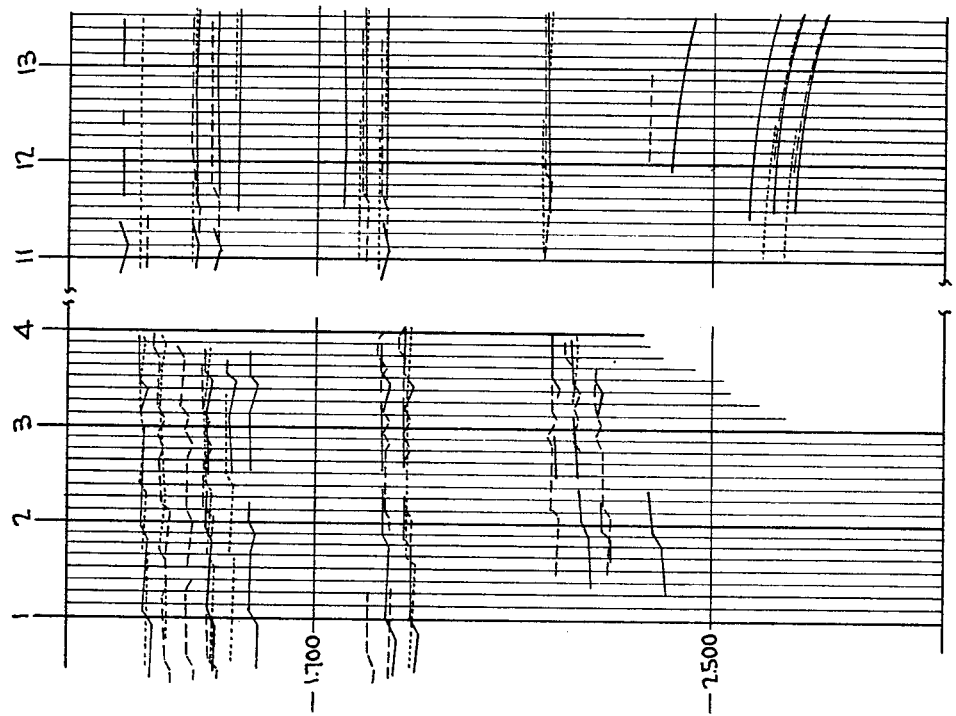
FIGURE 2 is an illustration of the prominent reflections of FIGURE 1 which have been transferred to an overlay.

FIGURE 2 represents the reflections which have been obtained from the three individual record sections by transposing the prominent reflections on each of the sections onto an overlay. The three types of lines seen on FIGURE 2—solid, dashed, and dotted—represent three colors as would be used on the rainbow section. It is important to recognize the fact that the prominent reflections indicated in FIGURE 2 have been obtained independently from each of the single coverage sections. This is evidenced by the fact that some of the reflections in FIGURE 2 do not extend entirely across the whole section. In such instances this is an indication that the particular reflection may not be outstanding on the single coverage section from which it was obtained.

The "rainbow" section may preferably be a clear plastic sheet which is placed over a record section and accurately positioned, with two or more widely spaced timing lines drawn on it and a few sub-surface common reflection locations marked on the top. The prominent reflections on each section are traced through onto the plastic sheet with a sharp colored pencil or colored ink in the form of a continuous line coinciding with the troughs of the pulses. The shot point position and edges of each record should be shown by solid and wavy vertical lines respectively, in the same color. This indicates those traces having full corrections to datum, and it may be helpful later in locating alignment lines. The process of tracing reflections is repeated three times in a different color for each section (three times for three-fold stacking; six times for six-fold stacking, etc.) resulting in three sets of reflection data superimposed on one another to give a rainbow appearance.

The "rainbow" section portrays by inspection how accurately each record has been corrected, and whether or not adequate data is available for the stacking process. An exact coincidence of reflections derived from all six sections would mean perfect corrections had been made and no further editing would be necessary. Such an ideal is never achieved as normal variations in the best of corrected data are probably ±0.010 second.

A grouping of reflection data in close proximity shows that the data were derived from the same horizon but are inadequately corrected for true coincidence. An analyst is able to make a visual analysis of the "rainbow" section to determine the average time, or the best time, to use for a given reflection. All the necessary data is available to draw in the best smooth line representing the most accurate position of a single reflection trough to represent the variety of times present from all of the record sections.

It may be advantageous to transpose the reflections from the various individual single coverage sections onto an overlay in different colors. Where this is done such an overlay transposition may be called a "rainbow" section. It should be recognized that at least the following four errors can be detected and corrected in accordance with the reflections on the "rainbow" section:

(1) Incorrect correction to datum.
(2) Weathering.
(3) Moveout.
(4) The mechanical or operator errors introduced in the initial processing of the recordings.

Figure 3:
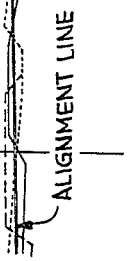
FIGURE 3 is an enlarged portion of the upper left-hand corner of FIGURE 2 showing the manner in which the alignment lines are drawn using the transferred reflections on the overlay as guides.

FIGURE 3 illustrates the next step in the process of providing corrections for seismic traces in accordance with the method set forth by the invention herein, namely, that of utilizing the reflections on the rainbow section to obtain alignment lines which can be used as reference lines from which the necessary corrections can be obtained. As shown in the figure the seismologist utilizes the independent reflections on the rainbow section to draw in what he estimates to be the best composite of the reflection data. This can perhaps best be thought of as an averaging process, although it need not be such as an experienced seismologist may decide to discard some of the information and weight certain of the reflections more than others. In any event, a solid alignment line is drawn in for each group of prominent reflections shown in FIGURE 2 on the rainbow section.

Figure 4:
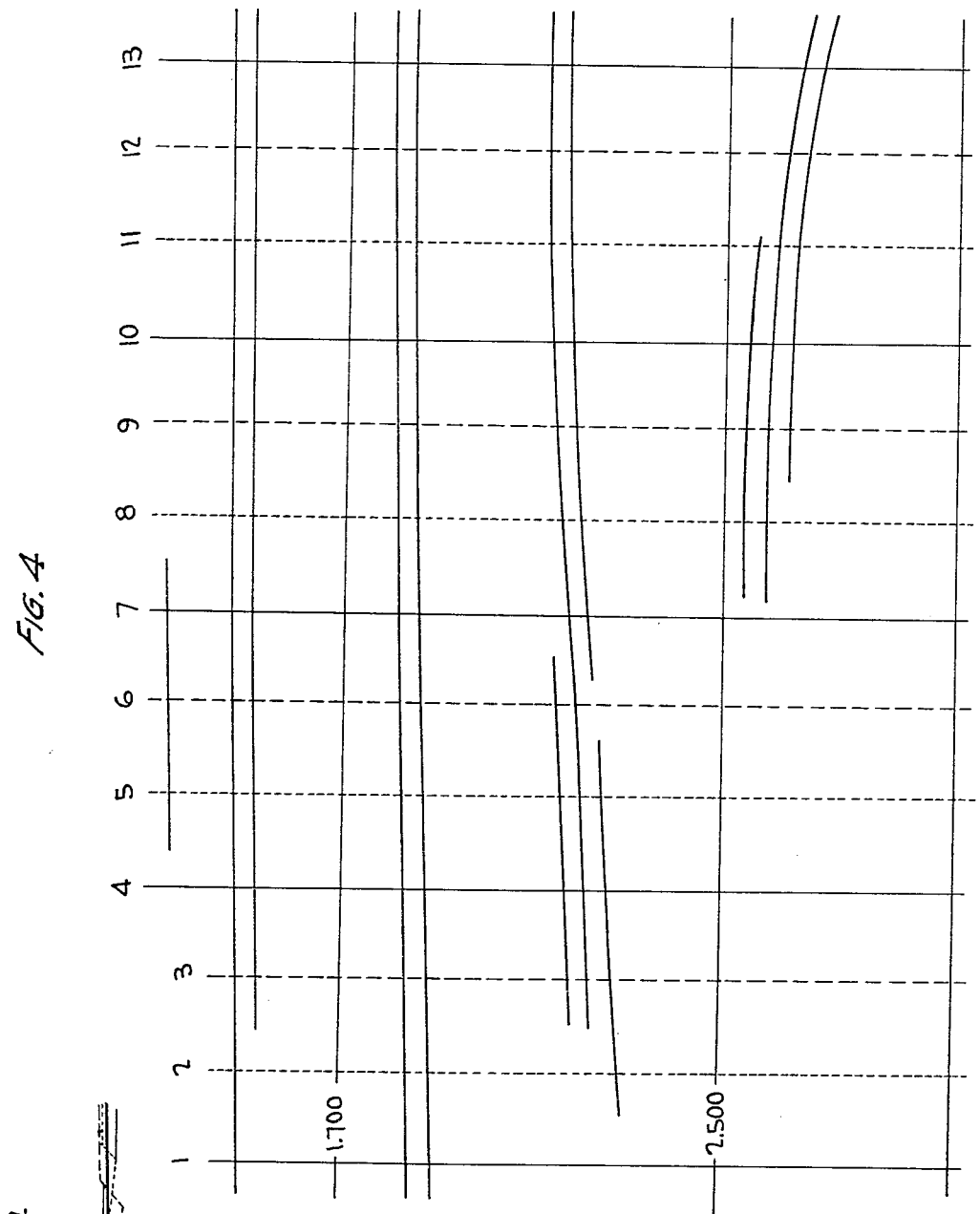
FIGURE 4 illustrates an alignment section drawn on a separate overlay having the alignment lines obtained as illustrated in FIGURE 3.

The alignment lines obtained by the aforedescribed process are indicated in an enlarged representation shown in FIGURE 4. It is preferable that the alignment lines be drawn on a transparent overlay which may be called an alignment section.

Alignment lines are traced through onto the alignment section only where several colored lines are in close enough proximity to indicate that reflections are derived from a common sub-surface source. The "rainbow" section makes it possible to judge the data objectively and to discard useless or fragmentary data as well as to utilize all available reliable data.

The alignment section is then positioned over the traces as shown in FIGURE 5 with timing lines superimposed and in the proper horizontal position. The alignment lines provide reliable reference levels to which reflection troughs may be corrected by applying minus or plus correction times to each trace as needed to pull the troughs of each trace onto the alignment lines. It is to be noted that there are some traces such as those marked minus 15 which have considerable step with respect to the alignment lines. This indicates that the weathering correction is improper on the trace and should be shifted by the difference between the actual valley of the wavy line and the alignment line. The figures at the right side of FIGURE 5 represent the displacement of the individual seismic traces with respect to the alignment lines. These figures indicate the amount of time by which each of the respective traces must be shifted either positively or negatively in order to be correctly aligned. The purpose of this editing procedure is to shift each of the individual reflections on the single coverage records to the proper value before the three field tapes as modified are stacked or added. This insures that the corrections are proper so that the desired reflections are in phase to obtain maximum reinforcement of the desired reflections when the individual records are composited. Those skilled in the art will recognize that the foregoing process of editing preserves the "character" of the recordings such that after the single coverage recordings have been corrected they will stack perfectly. Other means of editing such as mixing do not preserve the frequencies or phase relationships between the recordings. Consequently, editing by mixing does not present a true representation of the reflecting horizons. This is an important advantage of this editing process as those skilled in the art will readily recognize.

In obtaining the correction shifts to be applied to each reflection trace there are usually three or more alignment lines which provide a check for noise or other distortion that may be mistaken for reflected energy. If troughs of three or more reflections on a single trace all lie fifteen mils, for example, below three alignment lines, then the minus .015 correction is obvious and fully reliable. However, should three troughs of a single trace disagree in lag or lead time to the alignment lines, then the seismologist or analyst must look for character and for noise among the three events to decide which is valid reflection data and which is noise. The valid data can then be used for the correction. In certain circumstances the whole trace may be found to be unreliable and it can be deleted from the stacking process.

One of the most important features of the above described editing process is that the relatively smooth shape of the alignment lines causes the resultant stacked section to have a smooth appearance that can truly portray geologic structure rather than portray some imperfect geophysical manifestations of the same. As the actual reflecting geological horizons are smooth, it is appropriate and advantageous to obtain correspondingly smooth seismic sections. Undoubtedly the most important advantage of this process is the preservation of character. If the common reflection point energy returning to the surface is equalized in time before stacking, its true character and frequency is maintained. But a stacking process must derive its energy from equally timed pulses or else the frequency and character may be changed considerably.

Those skilled in the art will recognize other modifications of the method. While preferred embodiments of the invention have been shown and described, it will be apparent that changes may be made without departing from the principles and spirit of the invention.

Having thus described the invention, what is claimed as new and desired to be secured by Letters Patent is:

1. A method for determining the misalignment of seismic reflections comprising the steps of:
   (1) forming a number of sets of single coverage seismic cross-sections from different ones of a group of individual seismic traces,
   (2) identifying prominent reflections on each set of single coverage seismic traces,
   (3) assembling the corresponding prominent reflections from each of said sets and forming a representative reflection therefrom for each assemblage of prominent corresponding reflections, and
   (4) comparing the reflection times on the individual traces of each set of single coverage seismic cross-sections with the reflection times from the corresponding representative reflection times to determine the misalignment of the reflections associated with a common reflection point.

2. A method as set forth in claim 1 wherein step (1) includes the step of correcting the individual traces with static corrections and normal moveout.

3. A method as set forth in claim 2 wherein the forming of a number of sets of seismic cross-sections is such that the number of seismic sections is equal to the number of fold stacks.

4. The method as set forth in claim 2 wherein the step of identifying the prominent reflections of each set of single coverage cross-sections is done by the use of a template which is laid over and aligned with the timing marks of each set of single coverage cross-sections and tracing the reflection times of corresponding reflections thereon.

5. The method according to claim 4 wherein the step of assembling and forming a representative reflection from each set of prominent corresponding reflections is accomplished on a transparent sheet which is laid over and aligned with the template.

6. A method in accordance with claim 5 wherein said transparent sheet represents an alignment section which comprises sets of individual continuous lines which are drawn through reflections corresponding to the same common reflection point.

7. A method according to claim 6 wherein the step of comparing the reflection times on each set of traces includes the step of using the individual alignment lines as reference lines to determine the respective time shift necessary to bring the reflection times on each set of traces in alignment with the respective alignment lines.

8. The method according to claim 7 further comprising the step of indicating the respective time shifts associated with each seismic trace of each set of single coverage cross-sections prior to correcting and stacking said traces.

References Cited

UNITED STATES PATENTS

| | | |
|---|---|---|
| 2,348,411 | 5/1944 | Petty. |
| 2,686,633 | 8/1954 | Hale. |
| 2,765,455 | 10/1956 | Meiners. |
| 3,143,055 | 8/1964 | Alexander. |

WILLIAM D. MARTIN, JR., Primary Examiner